(12) United States Patent
Liu et al.

(10) Patent No.: US 9,245,501 B2
(45) Date of Patent: Jan. 26, 2016

(54) TOTAL FIELD OF VIEW CLASSIFICATION

(71) Applicant: MICROSOFT TECHNOLOGY LICENSING, LLC, Redmond, WA (US)

(72) Inventors: James Chia-Ming Liu, Bellevue, WA (US); Stephen Gilchrist Latta, Seattle, WA (US); Anton Andrews, Seattle, WA (US); Benjamin Isaac Vaught, Seattle, WA (US); Christopher Michael Novak, Redmond, WA (US); Sheridan Leigh Martin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/706,377

(22) Filed: May 7, 2015

(65) Prior Publication Data
US 2015/0235632 A1  Aug. 20, 2015

Related U.S. Application Data

(63) Continuation of application No. 13/167,113, filed on Jun. 23, 2011, now abandoned, and a continuation of application No. 13/692,885, filed on Dec. 3, 2012, now Pat. No. 9,041,623.

(51) Int. Cl.
*G09G 5/30* (2006.01)
*G09G 5/38* (2006.01)
*G02B 27/01* (2006.01)
(Continued)

(52) U.S. Cl.
CPC .............. *G09G 5/38* (2013.01); *G02B 27/0093* (2013.01); *G02B 27/0172* (2013.01); *G06F 3/011* (2013.01); *G02B 2027/0187* (2013.01)

(58) Field of Classification Search
CPC ............ G09G 5/00; G09G 5/12; G09G 5/377
See application file for complete search history.

(56) References Cited

U.S. PATENT DOCUMENTS 7,561,966 B2     7/2009  Nakamura et al.
7,605,773 B2 *  10/2009  Janssen .............................. 345/7
(Continued)

FOREIGN PATENT DOCUMENTS

CN          1629930 A     6/2005
CN          1922651 A     2/2007
TW        200632409 A     9/2006

OTHER PUBLICATIONS

Chinese Office Action dated May 11, 2015 with Search Report dated Apr. 28, 2015 in Application No. 2012800306196, 14 pages.
(Continued)

*Primary Examiner* — Michael Faragalla
(74) *Attorney, Agent, or Firm* — Brandon Roper; Judy Yee; Micky Minhas

(57) ABSTRACT

Virtual objects are located for display in a head-mounted display (HMD) to provide an augment reality view to an HMD wearer. An HMD wearer's total field of view (TFOV) is classified into two or more regions. Additionally, a field of view (FOV) for the HMD wearer is determined. The FOV is compared with the two or more regions of the HMD wearer's TFOV. Responsive to this comparison, virtual objects are determined for display based on a location of the FOV relative to the two or more regions of the HMD wearer's TFOV. The virtual objects may then be displayed by the HMD at an appropriate location.

20 Claims, 6 Drawing Sheets

(51) Int. Cl.
*G02B 27/00* (2006.01)
*G06F 3/01* (2006.01)

(56) References Cited

U.S. PATENT DOCUMENTS

2003/0169907 A1 9/2003 Edwards et al.
2009/0040233 A1 2/2009 Yamamoto
2010/0182340 A1* 7/2010 Bachelder et al. ............ 345/633

OTHER PUBLICATIONS

Taiwan Office Action dated Nov. 24, 2015 with Search Report dated Nov. 17, 2015 in Application No. 101115609, 4 pages.

* cited by examiner

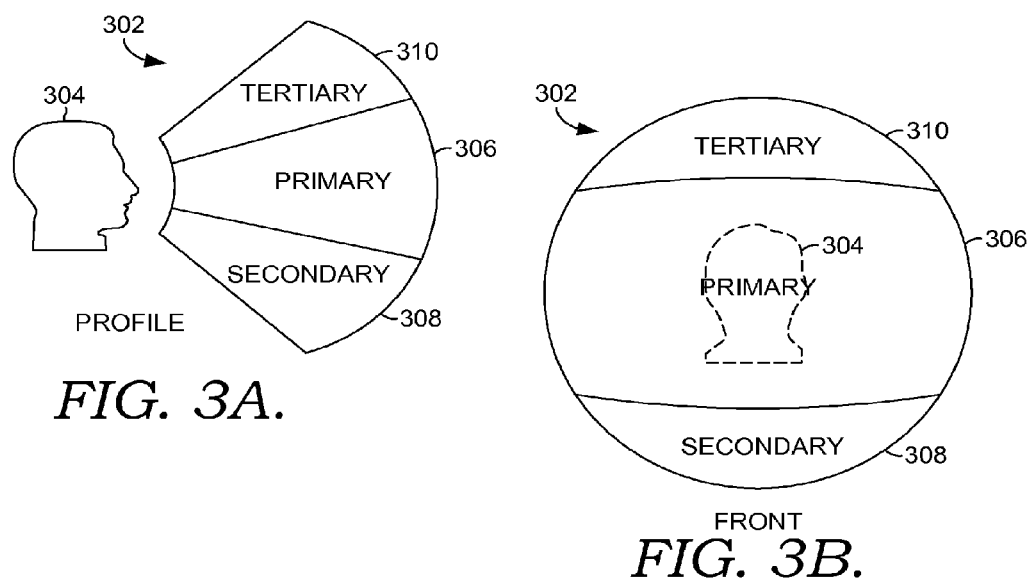
FIG. 3A.
FIG. 3B.
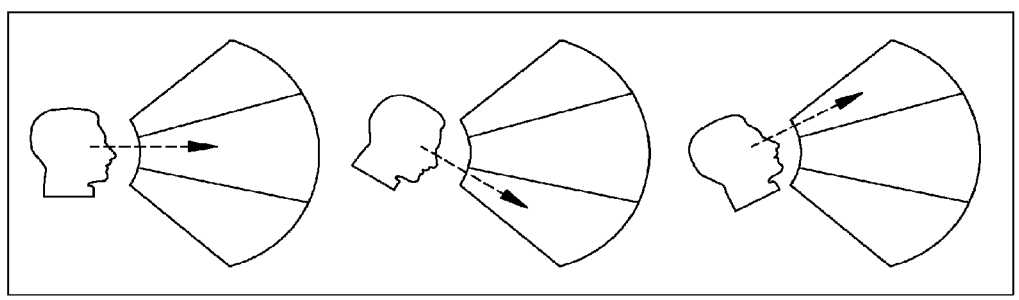
FIG. 4.
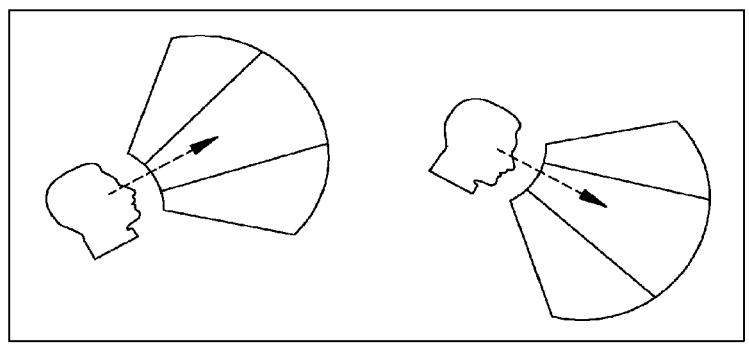
FIG. 5.

ant is directed to a method for displaying virtual objects using a head-mounted display (HMD). The method includes classifying two or more regions of an HMD wearer's total field of view (TFOV). The method also includes determining a field of view (FOV) for the HMD wearer. The method further includes comparing the FOV with the two or more regions of the HMD wearer's TFOV and determining one or more virtual objects to display based on a location of the FOV

TOTAL FIELD OF VIEW CLASSIFICATION

RELATED APPLICATION

This patent application is a continuation of U.S. application Ser. No. 13/692,885, filed Dec. 3, 2012 which is a continuation of U.S. application Ser. No. 13/167,113, filed Jun. 23, 2011. Each of the aforementioned applications is incorporated herein by reference in the entirety.

BACKGROUND

See-through head-mounted displays (HMDs) provide the ability to augment what the wearer sees with virtual objects. In other words, the HMD augments the HMD wearer's view of the real world with virtual imagery to provide an augment reality view. However, those virtual images can easily become distracting and obtrusive, drawing attention away from the real-world and occluding the HMD wearer's normal (non-augmented) view. This may present a challenge particularly in applications of "always-on" wearable display devices, especially when considering mobile, outdoor, and in-activity scenarios.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to locating virtual objects for display by a head-mounted display (HMD) to provide an augment reality view to an HMD wearer. An HMD wearer's total field of view (TFOV) is classified into various regions. Additionally, a field of view (FOV) for the HMD wearer is determined. The FOV is compared with the classified regions of the HMD wearer's TFOV. Responsive to this comparison, virtual objects are determined for display based on a location of the FOV relative to the regions of the HMD wearer's TFOV. The virtual objects may then be displayed by the HMD at an appropriate location.

BRIEF DESCRIPTION OF THE DRAWINGS

The present invention is described in detail below with reference to the attached drawing figures, wherein:

FIGS. 3A and 3B provide a profile and front views of an HMD wearer's TFOV classified with primary, secondary, and tertiary regions in accordance with an embodiment of the present invention;

FIG. 4 illustrates fixed regions for a HMD wearer's TFOV in accordance with an embodiment of the present invention;

FIG. 5 illustrates dynamic regions for an HMD wearer's TFOV in accordance with an embodiment of the present invention;

DETAILED DESCRIPTION

Figure 1:
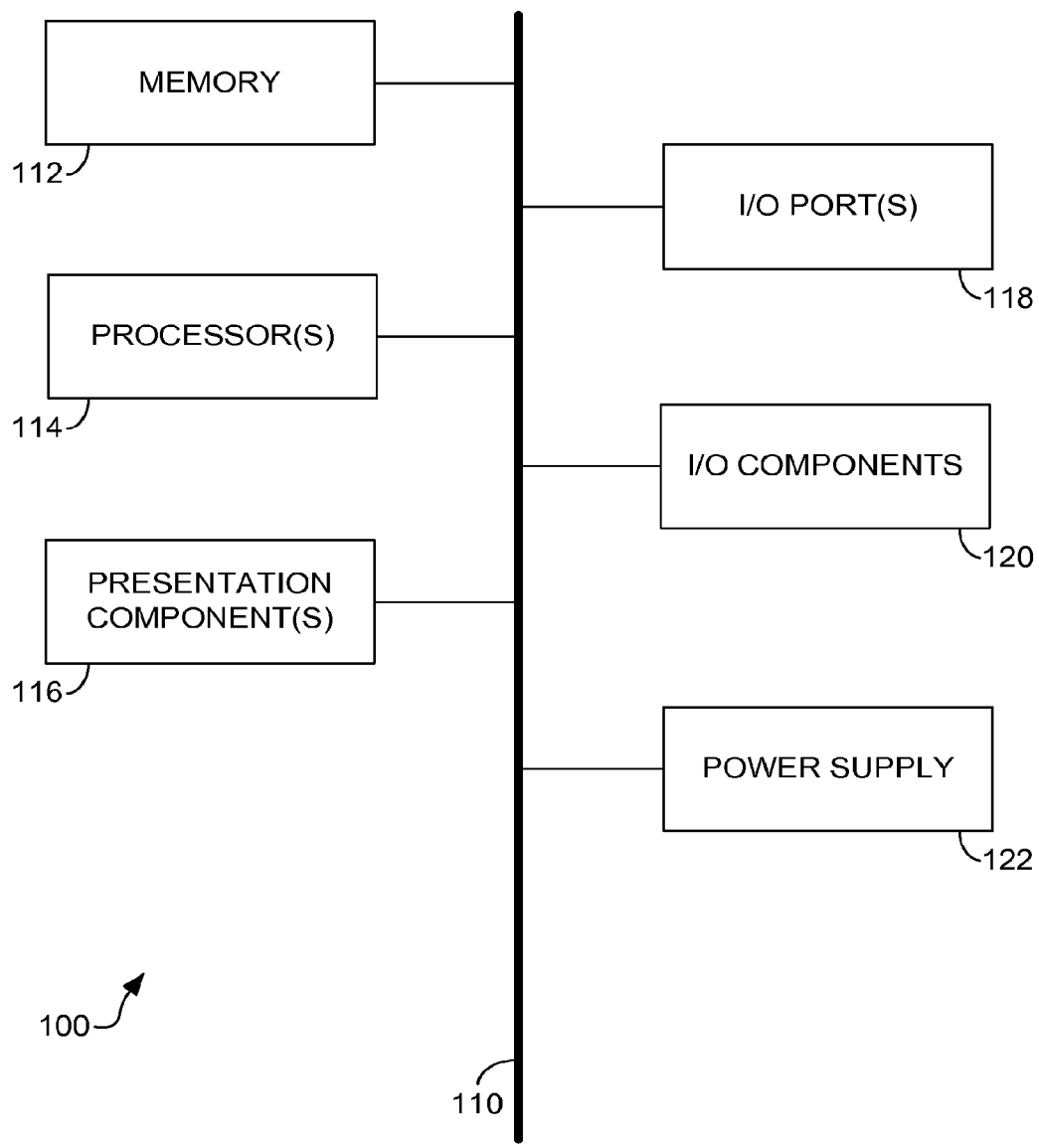
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are directed to the automatic and continuous placement and replacement of virtual images in an HMD's display relative to the HMD wearer's total field of view (TFOV) to provide the HMD wearer with an augmented reality view. As used herein, "TFOV" accounts for complete range of rotation and translation of a person's head. This is in contrast to a person's field of view (FOV), which accounts for the extent of what the person sees at a given moment.

In accordance with embodiments of the present invention, sensor data is collected from any number of on-board sensors provided on an HMD. Additionally, other data may be collected from sources external to the HMD. The sensor data and other data may be used to track and interpret the HMD wearer's physical head as it relates the HMD wearer's physical body and to the physical environment surrounding the HMD wearer. By tracking the HMD wearer's physical head relative to the HMD wearer's body and surrounding environment, the HMD wearer's TFOV may be classified into various regions. These regions may be defined relative to the HMD wearer's body and surrounding environment. In some embodiments, the regions may include a primary region and one or more non-primary regions. Virtual images may be located within the TFOV according to the classified regions. Accordingly, embodiments of the present invention provide a system that is aware of an HMD wearer's head relative to the HMD wearer's body and surrounding environment and may use such knowledge to locate virtual images relative to the HMD wearer's body and surrounding environment. In some embodiments, the virtual objects may be generally located away from the primary region and placed in unobtrusive regions such that the virtual images are presented in non-dangerous ways by reducing visual occlusion of the primary region. The virtual objects may also be located away from the primary region in order to provide context (e.g., classify the information as less relevant, less important, etc.).

Accordingly, in one aspect, an embodiment of the present invention is directed to a method for displaying virtual objects using a head-mounted display (HMD). The method includes classifying two or more regions of an HMD wearer's total field of view (TFOV). The method also includes determining a field of view (FOV) for the HMD wearer. The method further includes comparing the FOV with the two or more regions of the HMD wearer's TFOV and determining one or more virtual objects to display based on a location of the FOV relative to the two or more regions of the HMD wearer's TFOV. The method still further includes displaying the one or more virtual objects via a display component of the HMD.

In another embodiment, an aspect of the invention is directed to an HMD. The HMD includes one or more processors configured to: classify two or more regions of an HMD wearer's total field of view (TFOV), determine a field of view (FOV) for the HMD wearer, compare the FOV with the two or more regions of the HMD wearer's TFOV, and determine one or more virtual objects to display based on a location of the FOV relative to the two or more regions of the HMD wearer's TFOV. The HMD also includes one or more display components configured to display the one or more virtual objects to provide the HMD wearer with an augmented view.

A further embodiment is directed to a one or more computer storage media storing computer-useable instructions that, when used by one or more computing devices, cause the one or more computing device to perform operations. The operations include classifying two or more regions of an HMD wearer's total field of view (TFOV). The operations also include determining a field of view (FOV) for the HMD wearer. The operations further include comparing the FOV with the two or more regions of the HMD wearer's TFOV. The operations still further include locating one or more virtual objects within at least one of the two or more regions based on a location of the FOV relative to the two or more regions of the HMD wearer's TFOV.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
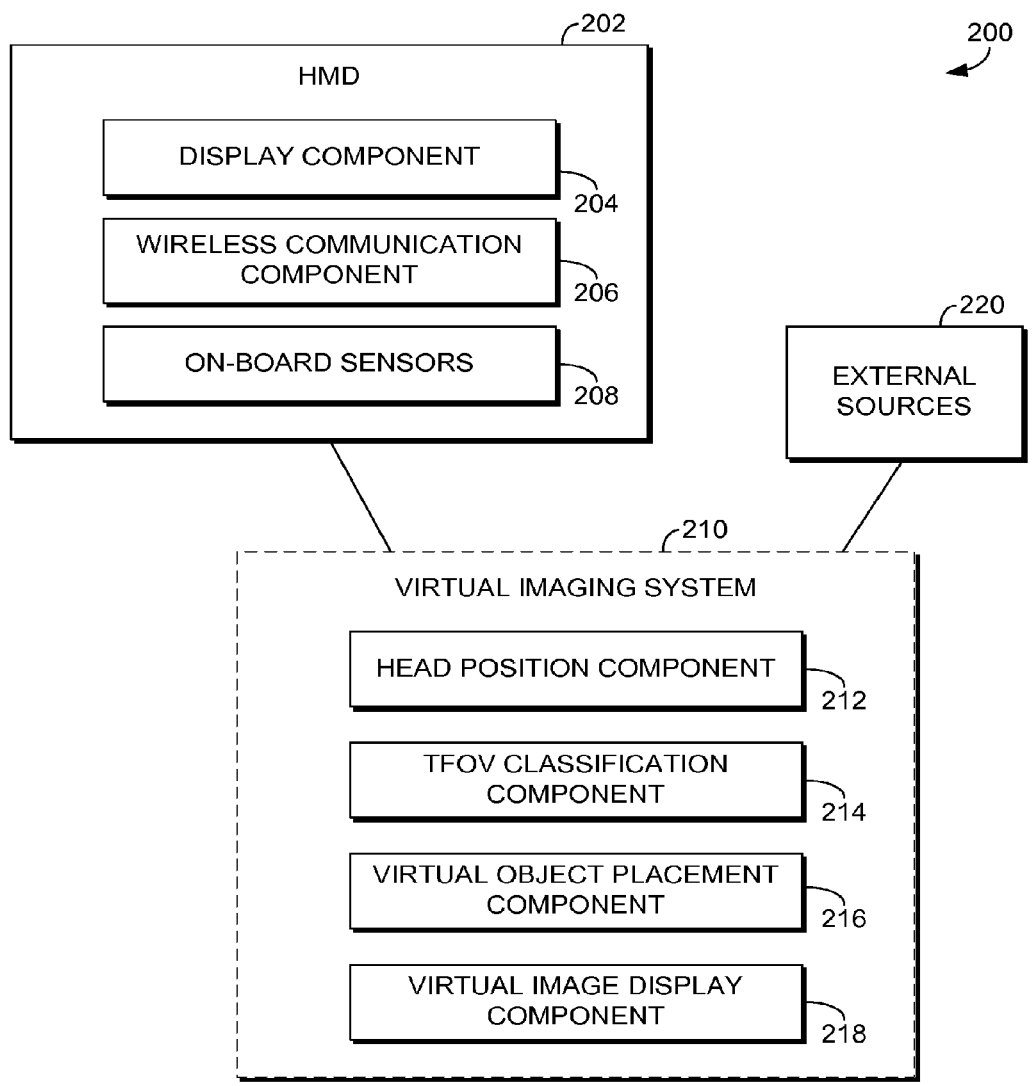
FIG. 2 is a block diagram of an exemplary system for classifying regions of a TFOV and locating virtual objects in the regions in accordance with an embodiment of the present invention.

Referring now to FIG. 2, a block diagram is provided that illustrates a system 200 for classifying an HMD wearer's TFOV and locating virtual objects in classified regions in accordance with an embodiment of the present invention. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

As shown in FIG. 2, the system 200 includes an HMD 202. Although not shown, the HMD 202 may include components such as those described above with reference to FIG. 1 for the general computing device 100, including, for instance, memory, processors, computer-readable media, input/output components, and a power supply. The HMD 202 may be provided in any of a number of different form factors, including, for instance, glasses, goggles, or a helmet.

The HMD 202 may generally provide an augmented view of the real world to a wearer by augmenting the wearer's view of the real world with computer-generated virtual images. To provide the wearer with an augmented view, the HMD 202 may include a display component 204 that displays computer-generated virtual images while still allowing the wearer to view the real world. In some embodiments, this may include heads-up display (HUD) technology, which may employ, for instance, any type of projection or microdisplay technology to provide the virtual images. Other technologies may also be employed, such as retinal displays in which images are projected directly onto the wearer's retina while the wearer is viewing the real world.

The HMD 202 may also include a wireless communication component 206 that provides wireless communication capabilities to allow the HMD 202 to communicate with companion devices (e.g., smartphones), server devices, or other network components. For instance, some embodiments of the present invention may be implemented by having a cloud-based service assist the HMD 202 in classifying regions of the HMD wearer's TFOV and locating virtual objects in those regions. In some embodiments, the HMD 202 may be configured to communicate directly with server devices; while in other embodiments, the HMD 202 may communicate with server devices via a companion device local to the HMD wearer (e.g., a smartphone or other device).

The HMD 202 may also include a number of on-board sensors 208 that provide positional and other sensor data. Any of a variety of different types of on-board sensors 208 may be included on the HMD 202 in accordance with various embodiments of the present invention. Generally, any sensor that allows the system to determine the HMD wearer's head position and rotation relative to the HMD wearer's body and surrounding environment, eye position, or other useful situational information may be employed. By way of example only and not limitation, the on-board sensors 208 may include GPS sensors, inertial measurement unit (IMU) sensors, depth sensors, cameras, eye tracking sensors, microphones, biometric sensors, and other types of sensors.

An IMU on the HMD 202 may measure inertial acceleration and may incorporate the functionality of accelerometers, gyroscopes, magnetometer, and other devices. In one embodiment, an IMU measurement of inertial acceleration has six degrees of freedom. Data from an IMU may provide relative movement and rotation information that may be employed with other data to infer absolute location in space. The additional data may include information from GPS sensors, which may be employed to provide location information on a macro level. In some embodiments, the HMD 202 may employ assisted GPS (A-GPS).

Depth sensors and cameras may be employed on the HMD 202 to collect data regarding the environment surrounding the HMD wearer. Depth sensors may generally include sensors that determine the distance to objects. In some implementations, a depth sensor may include an infrared sensor that captures IR light emitted from a transmission source and reflected from an object. Distance data may be determined using time-of-flight, triangulation, or other known principles. Cameras may be IR or visible spectrum, black and white or red-green-blue (RGB) cameras. In some embodiments, the parallax between images from two different cameras can be used to measure depth much as a person's two eyes provide depth perception.

The HMD 202 may also include one or more eye-tracking sensors, which typically track the movement of the pupil or other portions of the eye or the area around the eye to determine the direction of a user's gaze. This may be accomplished, for example, using IR or RGB cameras aimed at the HMD wearer's eyes. Microphones may be provided to collect audio information, including the HMD wearer's voice and surrounding environmental audio. Biometric sensors may be used to collect biometric information for the HMD wearer.

Sensor data from the on-board sensors 208 may be provided to a virtual imaging system 210 for processing. In some embodiments of the present invention, the virtual imaging system 210 may be provided on the HMD 202. In other embodiments, the virtual imaging system 210 may be provided by a device external to the HMD 202, such as a server device or other network component. In still further embodiments, the virtual imaging system 210 may be distributed across multiple devices (e.g., the HMD 202 and an external device). Any and all such variations are contemplated to be within the scope of embodiments of the present invention.

The virtual imaging system 210 includes a head position component 212 that is operable to receive sensor data from the on-board sensors 208 and determine the HMD wearer's head position and rotation relative to HMD wearer's surrounding environment and the HMD wearer's body. By way of example only and not limitation, the head position component 212 may employ techniques such as simultaneous location and mapping (SLAM) using, for instance, camera data and/or depth sensor data to provide a real-time position of the HMD wearer's head relative to a mapped surrounding environment. IMU data may also provide relative rotation and position information even when the camera or depth sensors are unavailable. Regions of the HMD wearer's body (e.g., hand, arm, torso, legs, feet, etc.) may also be identified using sensor data. For instance, camera data and/or depth sensor data may be obtained when the HMD wearer is looking at him or herself. As such, the HMD wearer's head position and rotation relative to the HMD wearer's body may be inferred to a useful degree of accuracy. This may include information such as whether the HMD wearer is standing, sitting, looking straight ahead relative to torso, to name a few.

The head position component 212 may also receive data from sensors and other sources 220 external to the HMD 212. By way of example only and not limitation, the other sources 220 may include external cameras, external depth sensors (e.g., a KINECT sensor), other HMDs, mobile devices, and historical sensor data stored remotely from the HMD. Generally, any external source of information that allows the system to determine the HMD wearer's head position and rotation relative to the HMD wearer's body and surrounding environment, eye position, or other useful situational information may be employed.

Data from the various on-board sensors 208 and external sources 220 may generally provide redundancies and refinement. However, it should be understood that not all sensors are necessary. Any combination of sensors indicated herein, as well as other sensors and sources of information, may be employed within the scope of embodiments of the present invention.

After the head position component 212 resolves the HMD wearer's head position and rotation relative to the HMD wearer's body and surrounding environment, the TFOV classification component 214 classifies regions of the HMD wearer's TFOV. In accordance with embodiments of the present invention, the TFOV classification component 214 identifies regions of the HMD wearer's TFOV according to various rules. The rules may be user-defined or system-defined. Additionally, the rules may be immutable, dynamic based on different inputs regarding the HMD wearer's current situation and environment, or alterable by the HMD wearer to provide the best experience for the HMD wearer based on what the HMD wearer is currently doing.

In some embodiments of the present invention, the regions may include a primary region and any number of additional non-primary regions. The primary region may correspond with a primary area within the HMD wearer's FOV. Generally, this corresponds with an area that should not be occluded with virtual objects. The non-primary regions correspond with areas that may be occluded with virtual objects.

By way of example, FIGS. 3A and 3B illustrate a profile view and front view, respectively, of a TFOV 302 for an HMD wearer 304. As shown in FIGS. 3A and 3B, the TFOV 302 has been classified into a primary region 306, a secondary region 308, and a tertiary region 310. It should be noted that the classification shown in FIGS. 3A and 3B are provided as examples only, and the TFOV may generally be classified into any number of regions. The regions may be symmetrical or non-symmetrical. Additionally, the regions may be divided vertically, horizontally, or any permutation thereof. In some embodiments, the regions may be classified relative to the HMD wearer's body or body parts. For instance, the regions may comprise an upper left of body region, upper right of body region, lower left region of body, and lower right region of body.

The classification of regions of the TFOV may be fixed or may dynamically change. By way of illustration, examples of fixed regions versus dynamic regions are provided in FIGS. 4 and 5. Initially, FIG. 4 illustrates an example of fixed regions. As shown in FIG. 4, as the HMD wearer moves his/her head looking up and down, the regions remain fixed. In contrast, FIG. 5 illustrates an example of dynamic regions. As shown in FIG. 5, as the HMD wearer moves his/her head up and down, the regions move with the HMD wearer's head movements.

TFOV regions may dynamically change by automatically adjusting the size (i.e., expanding or shrinking) of regions, shifting regions within the TFOV, or completely re-classifying new regions for the TFOV. The regions may automatically change based on rules triggered by events, environmental conditions, body placement and movement, and additional sensor information. For instance, if the HMD wearer is sitting, the primary region may be relatively small since the HMD wearer is stationary and it's safer to occlude more of the HMD wearer's FOV. However, if the HMD wearer stands and begins to walk, the primary region may expand such that less of the HMD wearer's FOV is occluded with virtual images. If the HMD wearer begins running or begins to drive a car, the primary region may expand even further. As an example of re-classifying regions, suppose the HMD wearer's eyes are gazing and hands are moving in a secondary region of the TFOV. This may be indicative that the HMD wearer is performing some task in that space. As a result of these inputs, the TFOV may be re-classified such that region is now the primary region. Other environmental conditions may also affect the classification of regions. For instance, biometric inputs may indicate that the HMD wearer is nervous or frightened. In response, the primary region may expand.

In accordance with some embodiments of the present invention, combinations of fixed regions and dynamically changing regions may be employed over time by employing rules that control whether fixed regions or dynamic regions are employed at any given time. In particular, some circumstances may dictate the use of fixed regions, while other circumstances may dictate the use of dynamic regions. For instance, the regions may initially be fixed for a given time period. When certain inputs are received, rules may then dictate dynamically changing the regions. By way of specific example, if the HMD wearer is sitting, the regions may remain fixed while the HMD wearer remains sitting. However, once the HMD wearer gets up, rules may be triggered to cause the regions to dynamically change as the user moves around in space. Accordingly, the region classifications may be environmentally-adaptive.

After classifying regions of the TFOV, the virtual object placement component 216 may locate virtual objects in the various regions according to the classifications. Generally, the virtual objects may be placed in regions according to defined rules. The rules may be user-defined or system-defined. Additionally, the rules may be immutable, dynamic based on different inputs regarding the HMD wearer's current situation and environment, or alterable by the HMD wearer to provide the best experience for the HMD wearer based on what the HMD wearer is currently doing. In some embodiments, this may include placing most virtual objects into non-primary regions of the TFOV to prevent occluding the primary region. In some instances, only notifications, less intrusive virtual objects, or virtual objects deemed to be more important may be located in the primary region.

Figure 6:
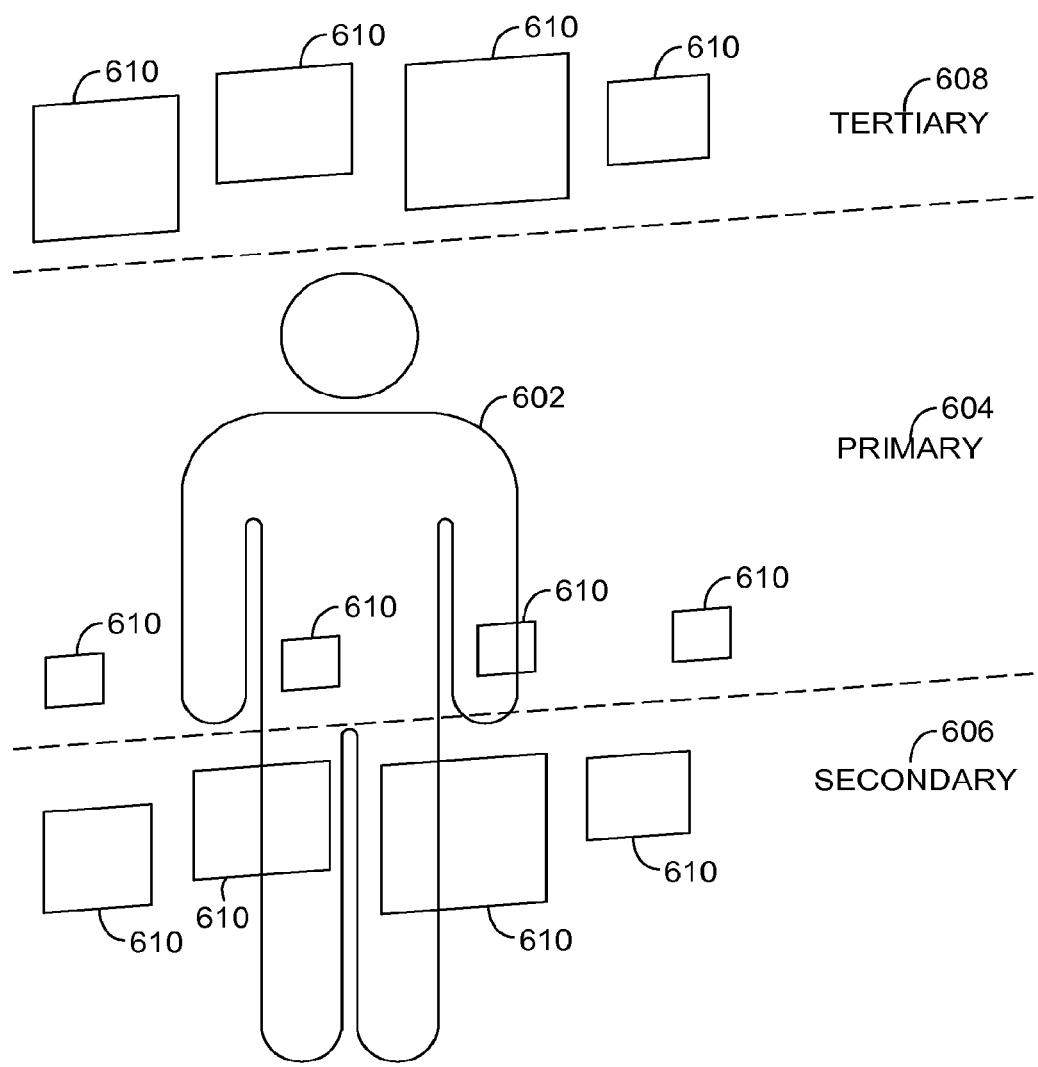
FIG. 6 illustrates an HMD wearer's view with virtual objects located in primary, secondary, and tertiary regions in accordance with an embodiment of the present invention.

By way of illustration, FIG. 6 provides a view provided to an HMD wearer in accordance with an embodiment of the present invention. As shown in FIG. 6, the HMD wearer is currently viewing another person 602. The HMD wearer's FOV covers a primary region 604, secondary region 606, and tertiary region 608 of the TFOV. It should be noted that the dashed lines and region labels are provided in FIG. 6 for discussion purposes, and those would not be displayed to the HMD wearer. Instead, only the virtual objects 610 would be displayed. As shown in FIG. 6, only smaller notification virtual objects 610 are displayed within the primary region 604, while larger, more intrusive virtual objects 610 are displayed within the secondary region 606 and tertiary region 608. As a result, the primary region 604 remains generally unobstructed by virtual objects.

In various embodiments of the present invention, a permission set may be employed to govern placement of content within the TFOV. This may include universal rules that span across applications or circumstances that dictate to place or not place specific content in specific regions. There may be also be changing TFOV permissions based on status (e.g., rules for placement of virtual objects when the user is driving may be different from rules for placement of virtual objects when the user is in a living room). There may also be permission sets that change based on the classification of the application being run by the system. The interplay between these global/state/application-based permissions drives the content and the location of the content displayed within the TFOV.

In embodiments in which regions are classified relative to the HMD wearer's body, virtual objects may be located in the regions in order to locate those virtual objects relative to the HMD wearer's body. For instance, a region may be classified around the HMD wearer's foot as a foot region, and a particular virtual object may be located in that region in order to located the virtual object near the HMD wearer's foot. As another example, a region surrounding the HMD wearer's torso may be classified as a torso region, and a virtual desktop may be located in that region to contain information the HMD wearer may want to access. As such, the HMD wearer may view the information by looking down at the virtual desktop surrounding the HMD wearer's torso.

In some instances, the virtual objects may include static objects that are not interactive. For instance, virtual objects may simply display information or graphics for the HMD wearer to view. In other instances, the virtual objects may be user interface (UI) objects with which the HMD wearer may interact, using gestures, voice commands, and/or other forms of input.

Because the TFOV extends beyond the HMD wearer's FOV, only a portion of all virtual objects within the TFOV may be viewed by the HMD wearer at any give time. Accordingly, the virtual image display component 218 may be operable to determine the HMD wearer's current FOV within the TFOV and to cause virtual objects to be displayed in the appropriate locations within the HMD wearer's FOV. For instance, if a virtual object is located in a TFOV region near the HMD wearer's feet, the virtual object would not be displayed when the HMD wearer is looking up. However, if the HMD wearer were to look down, the virtual image display component 218 would determine that the HMD wearer's FOV is over the foot region and would cause the virtual object to be displayed at the appropriate location. It should be noted that in some embodiments, the extent of the HMD wearer's FOV may simply be considered to correspond with the extent of the display area of the display component 204 of the HMD 202.

In some embodiments, the HMD's FOV may extend beyond the HMD wearer's FOV. For instance, the depth sensors, cameras, and other on-board HMD sensors, as well as external sensors may be able to capture data outside of the HMD wearer's FOV. As such, the HMD's FOV may be defined by the extent to which the various sensors cover, which may extend well beyond the HMD wearer's FOV. Some embodiments may take advantage of the HMD's FOV by allowing an HMD wearer to interact with a virtual object that is not currently displayed to the HMD wearer because it is outside the HMD wearer's FOV, as long as the virtual object is located within the HMD's FOV. For instance, suppose an interactive virtual object is located adjacent in a region adjacent to the HMD wearer's right hip. The HMD wearer may interact with the virtual object even when the HMD wearer is looking elsewhere and the virtual object is not being displayed to the HMD wearer, as long as the area adjacent to the HMD wearer's right hip at which the virtual object is located is within the HMD's FOV such that the HMD may capture the HMD wearer's interaction with the virtual object.

Figure 7:
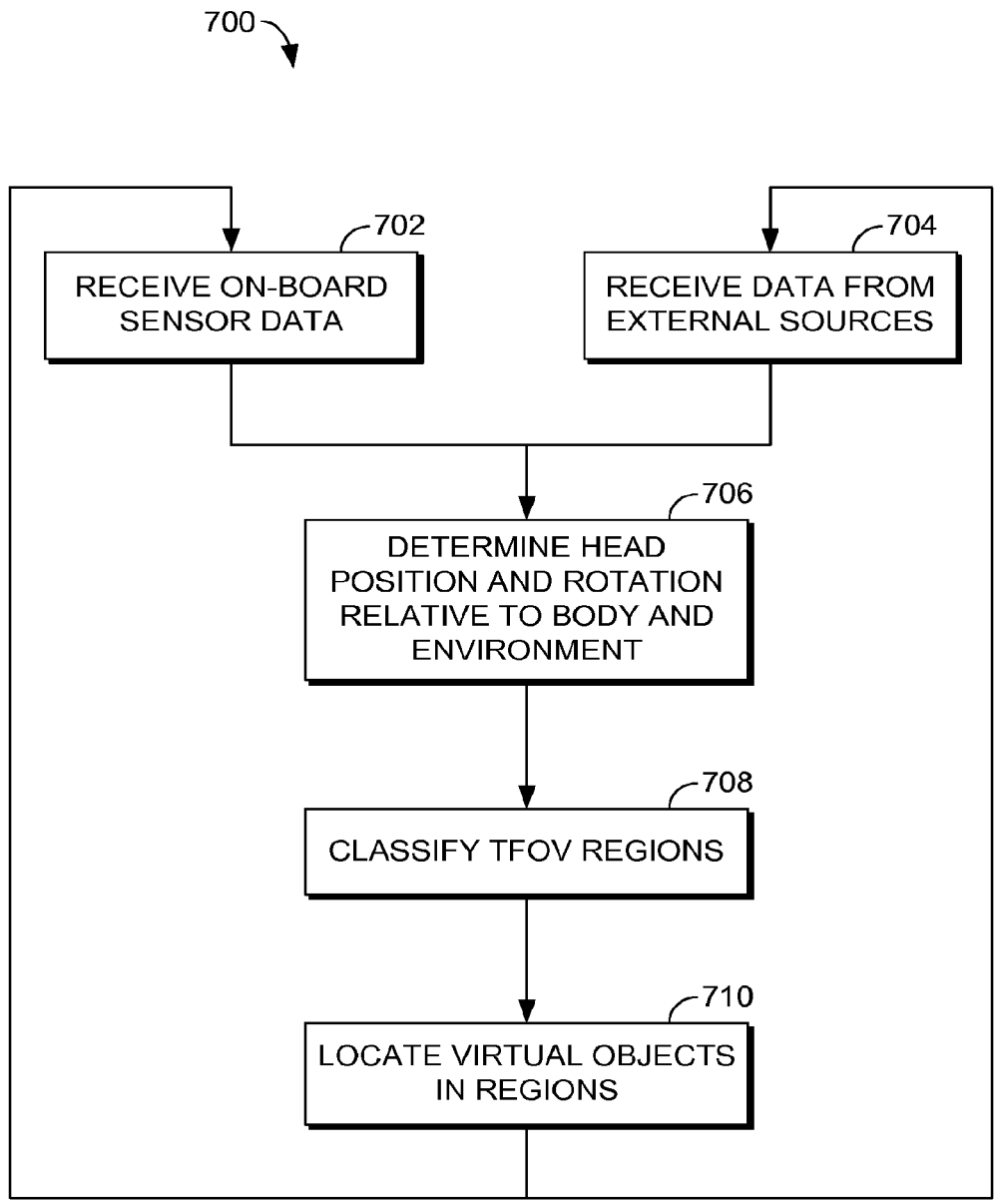
FIG. 7 is a flow diagram showing a method for classifying regions of an HMD wearer's TFOV in accordance with an embodiment of the present invention.

Referring now to FIG. 7, a flow diagram is provided that illustrates a method 700 for classifying regions of an HMD wearer's TFOV in accordance with an embodiment of the present invention. The method 700 may be performed, for instance, by an HMD, a device external to the HMD, or a combination thereof. As shown at block 702, data from on-board sensors provided on an HMD is received. As discussed previously, the on-board sensors may include, without limitation, GPS sensors, inertial measurement unit (IMU) sensors, depth sensors, cameras, eye tracking sensors, microphones, biometric inputs, and other sensors. Additionally, data may be received from sources external to the HMD, as shown at block 704. By way of example only and not limitation, this may include external cameras, external depth sensors, other HMDs, mobile devices, and historical sensor data stored remotely from the HMD.

Based on the sensor data from the on-board sensors and other data from the external sources, the HMD wearer's head position and rotation are determined relative to the HMD wearer's body and surrounding environment, as shown at block 706. Using that information, the HMD wearer's TFOV is classified into two or more regions, as shown at block 708. In accordance with embodiments of the present invention, the TFOV is classified according to rules that may be user-defined or system-defined and immutable or dynamic. Virtual objects are located in the regions of the TFOV, as shown at block 710. A number of rules may also be defined for placing the various virtual objects into the regions. These rules may also be user-defined or system-defined and immutable or dynamic. In some embodiments, the system may take into account the applications that are being accessed when determining where to locate the various virtual objects. As represented by the return to blocks 702 and 704, the process of classifying regions of the TFOV may be repeated. In some embodiments, one or more rules may trigger reclassifying regions of the TFOV, while in other embodiment, the TFOV may be continuously reclassified.

Figure 8:
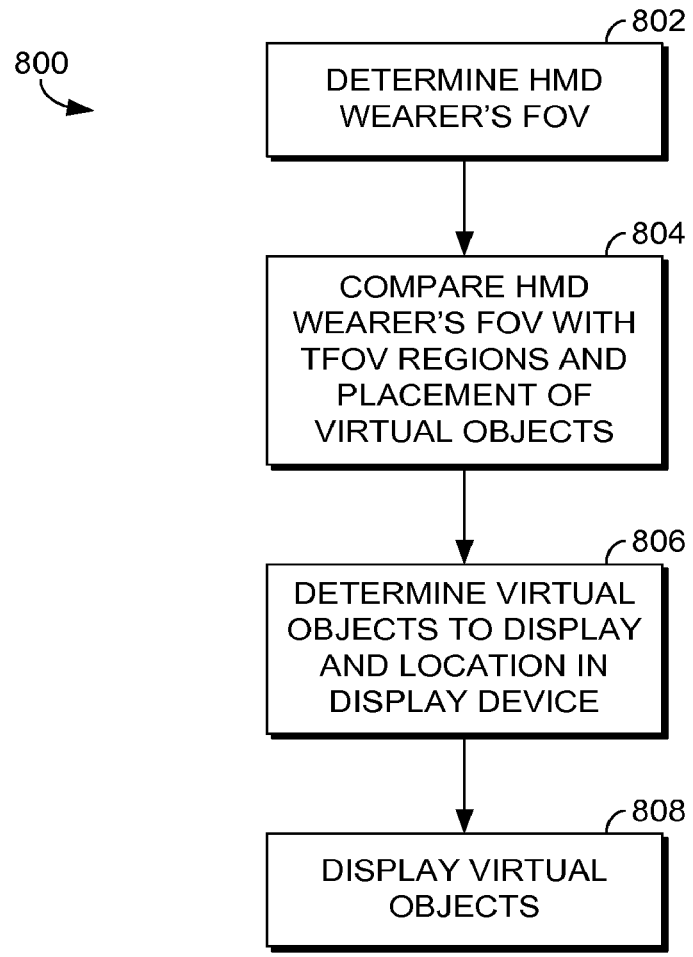
FIG. 8 is a flow diagram showing a method for displaying virtual objects using an HMD in accordance with an embodiment of the present invention.

Turning to FIG. 8, a flow diagram is provided that illustrates a method 800 for displaying virtual objects using an HMD in accordance with an embodiment of the present invention. As shown at block 802, the HMD wearer's FOV is initially determined. In some embodiments, the extent of the HMD wearer's FOV may simply correspond with the extent the display area provided by a display component of the HMD. As shown at block 804, the HMD wearer's FOV is compared with regions of a TFOV that have been determined, for instance, using the method 700 described above with reference to FIG. 7. The comparison identifies the placement of the HMD wearer's FOV relative to the regions of the TFOV.

The virtual objects to display are determined at block 806 based on the location of the HMD wearer's FOV relative to the TFOV regions and the location of virtual objects in the TFOV regions. In some embodiments, a set of permissions may be applied at this point to govern usage of virtual objects based on, for instance, the current user state or the specific application(s) being engaged. The virtual objects that are identified are then displayed using a display component of the HMD at the appropriate location, as shown at block 808.

As can be understood, embodiments of the present invention provide for classifying regions of an HMD wearer's TFOV based on sensor inputs and rules and locating virtual objects in the classified regions. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A method for displaying virtual objects using a head-mounted display (HMD), the method comprising:

classifying two or more regions of an HMD wearer's total field of view (TFOV);

determining a field of view (FOV) for the HMD wearer;

comparing the FOV with the two or more regions of the HMD wearer's TFOV;

determining one or more virtual objects to display based on a location of the FOV relative to the two or more regions of the HMD wearer's TFOV; and displaying the one or more virtual objects via a display component of the HMD.

2. The method of claim 1, wherein at least one of the two or more regions is classified relative to the HMD wearer's body.

3. The method of claim 2, wherein determining the one or more virtual objects to display based on the location of the FOV relative to the two or more regions of the HMD wearer's TFOV comprises locating at least one of the one or more virtual objects relative to HMD wearer's body based on classifying the at least one of the two of more regions relative to the HMD wearer's body.

4. The method of claim 1, wherein at least one of the two or more regions is classified relative to the HMD wearer's surrounding environment.

5. The method of claim 1, wherein the two or more regions are classified based on sensor data from one or more sensors on board the HMD.

6. The method of claim 1, wherein the two or more regions are classified based on data from one or more sources external to the HMD.

7. The method of claim 1, wherein the two or more regions are fixed within the HMD wearer's TFOV.

8. The method of claim 1, wherein the two or more regions dynamically change within the HMD wearer's TFOV.

9. The method of claim 1, wherein the two or more regions include a primary region and one or more non-primary regions.

10. The method of claim 9, wherein determining the one or more virtual objects to display based on the location of the FOV relative to the two or more regions of the HMD wearer's TFOV comprises locating the one or more virtual objects to reduce occluding the primary region.

11. The method of claim 1, wherein the method further comprises identifying user interaction with an interactive virtual object located in a first region from the two or more regions, the first region being outside the FOV, and performing an action in response to the user interaction with the interactive virtual object.

12. A head-mounted display (HMD) comprising:
one or more processors configured to:
classify two or more regions of an HMD wearer's total field of view (TFOV),
determine a field of view (FOV) for the HMD wearer,
compare the FOV with the two or more regions of the HMD wearer's TFOV, and
determine one or more virtual objects to display based on a location of the FOV relative to the two or more regions of the HMD wearer's TFOV; and
one or more display components configured to display the one or more virtual objects to provide the HMD wearer with an augmented view.

13. The HMD of claim 12, wherein the HMD comprises one or more on-board sensors configured to provide sensor data, and wherein the one or more processors are further configured to determine a position and/or rotation of an HMD wearer's head relative to the HMD wearer's body and/or an environment surrounding the HMD wearer based on the sensor data.

14. The HMD of claim 12, wherein the HMD further comprises a wireless communication component, wherein the wireless communication component is configured to receive sensor data from one or more sources external to the HMD, and wherein the one or more processors are further configured to determine a position and/or rotation of an HMD wearer's head relative to the HMD wearer's body and/or an environment surrounding the HMD wearer based on the sensor data.

15. The HMD of claim 12, wherein at least one of the two or more regions is classified relative to at least one selected from the following: the HMD wearer's body; and the HMD wearer's surrounding environment.

16. The HMD of claim 12, wherein determining the one or more virtual objects to display based on the location of the FOV relative to the two or more regions of the HMD wearer's TFOV comprises locating at least one of the one or more virtual objects relative to HMD wearer's body based on classifying at least one of the two of more regions relative to the HMD wearer's body.

17. The HMD of claim 12, wherein the two or more regions include a primary region and one or more non-primary regions, and wherein determining the one or more virtual objects to display based on the location of the FOV relative to the two or more regions of the HMD wearer's TFOV comprises locating the one or more virtual objects to reduce occluding the primary region.

18. The HMD of claim 12, wherein the one or more processors are further configured to: identify user interaction with an interactive virtual object located in a first region from the two or more regions, the first region being outside the FOV, and performing an action in response to the user interaction with the interactive virtual object.

19. One or more computer storage devices storing computer-useable instructions that, when used by one or more computing devices, cause the one or more computing devices to perform operations, the operations comprising:
classifying two or more regions of an HMD wearer's total field of view (TFOV);
determining a field of view (FOV) for the HMD wearer;
comparing the FOV with the two or more regions of the HMD wearer's TFOV; and
locating one or more virtual objects within at least one of the two or more regions based on a location of the FOV relative to the two or more regions of the HMD wearer's TFOV.

20. The one or more computer storage devices of claim 19, wherein the operations further comprise displaying at least one of the one or more virtual objects via a display component of the HMD.

* * * * *